United States Patent [19]

Smith

[11] 4,344,826

[45] Aug. 17, 1982

[54] DISTILLATION SYSTEM AND PROCESS
[75] Inventor: Verity C. Smith, Dedham, Mass.
[73] Assignee: Vaponics, Inc., Plymouth, Mass.
[21] Appl. No.: 161,338
[22] Filed: Jun. 20, 1980
[51] Int. Cl.³ .............................. C02F 1/04; C02F 1/44
[52] U.S. Cl. .......................................... 203/2; 203/10;
203/22; 203/27; 203/39; 203/DIG. 16;
202/176; 202/180; 202/195; 159/DIG. 27;
210/321.1; 210/433.2; 210/652; 236/12 R
[58] Field of Search .................. 203/2, 10, 11, 21, 27,
203/22, 39, 41, 99, DIG. 17, DIG. 16; 202/180,
160, 195, 185 R, 186, 176; 210/321.1, 433.2,
652, 655, 180; 159/DIG. 27; 236/12.11 R, 12.12
M; 208/353, 364; 196/134

[56] References Cited
U.S. PATENT DOCUMENTS 3,190,320 6/1965 Burgess et al. ........................... 141/1
3,245,537 4/1966 Burgess ................................. 210/85
3,298,929 1/1967 Smith .................... 202/190
3,334,745 8/1967 Burgess et al. ........................ 210/93
3,574,077 4/1971 Tsunoda et al. ............ 159/DIG. 27
3,632,505 1/1972 Nelson ..................... 203/39
3,669,878 6/1972 Marantz et al. ...................... 210/632
3,669,880 6/1972 Marantz et al. ...................... 210/632
3,721,386 3/1973 Brick et al. ............................ 236/12
3,766,060 10/1973 Smith .................................. 210/748
3,841,976 10/1974 Scott et al. ................. 159/DIG. 27
3,853,478 12/1974 Rodgers ........................... 210/321.1

Primary Examiner—Wilbur L. Bascomb, Jr.
Attorney, Agent, or Firm—Kenway & Jenney

[57] ABSTRACT

The waste water output of an RO unit in a distillation system is conveyed to a still's condenser cooling coil to minimize water requirements of the system. A portion of the heated water from the condenser, in one embodiment, is circulated to the RO unit inlet, where a temperature mixing valve maintains an optimum temperature for the RO inlet water by mixing feed water and condenser output water in the desired proportions.

10 Claims, 2 Drawing Figures

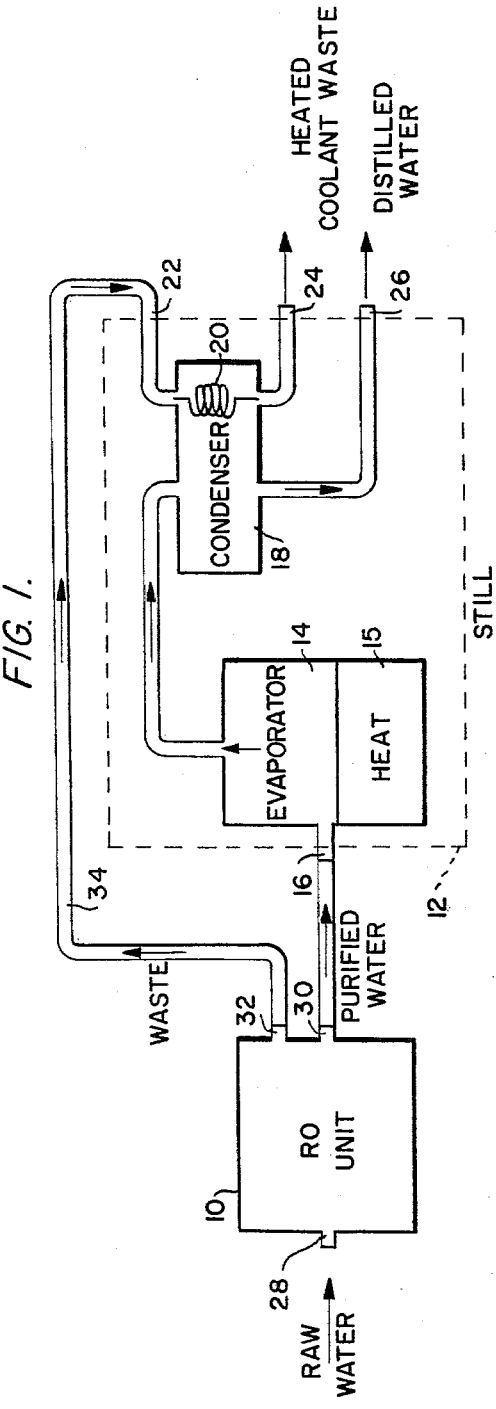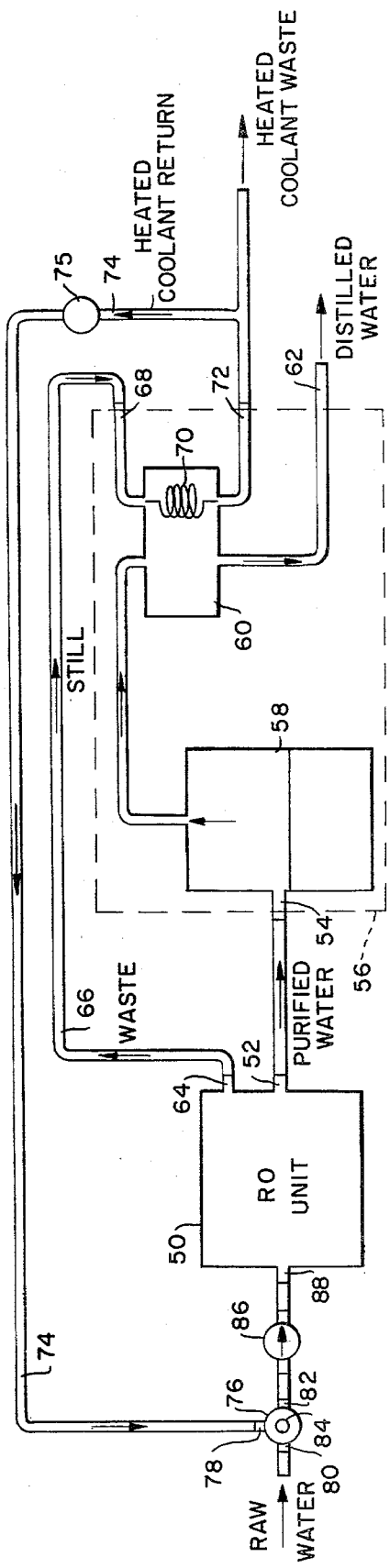

DISTILLATION SYSTEM AND PROCESS

BACKGROUND OF THE INVENTION

The invention relates generally to distillation systems and particularly to distillation systems that include a reverse osmosis unit.

One of the maintenance problems that besets anyone operating a water still is the formation of scale in the evaporator. This can be reduced or eliminated by the removal or partial removal of the dissolved solids before the water is fed to the still. Ion exchange and reverse osmosis are some of the processes used in accomplishing the desired reduction in total solids.

There are drawbacks to the use of the reverse osmosis process. One of them is that reverse osmosis membranes have been quite expensive and have had a flux (which is the ability of the water to pass through the membrane) of such a capacity that a large amount of membrane has been necessary to produce a reasonable flow of water even when the water is pumped to the membrane at pressures up to 400 psig. Recently there have been improvements in membrane design which have made it possible to operate membranes at pressures as low as 50 psig. This means that a membrane of reasonable cost will produce approximately one gallon of water per hour when operated at a pressure of approximately 50 psig. Theoretically, therefore, one of such membranes could be placed ahead of a one gallon per hour still, and prevent scale formation in that still at a reasonable cost.

The reverse osmosis membranes have other shortcomings, however. They include the possibility of precipitation of such salts as calcium sulfate and calcium carbonate on the membrane surface unless some precautions are taken to prevent this precipitation. Also, if calcium carbonate precipitates on a cellulose acetate membrane the high pH created by the calcium carbonate will degrade and essentially destroy the membrane.

Methods to prevent this precipitation include softening the water, controlling the inlet pH with an acid feed system, or bypassing large quantities of water by the membrane surface to prevent the concentration of salts on the surface which can lead to the precipitation process. If the final method is employed, the production of water from the reverse osmosis unit may be only between 5% and 25% of the volume of the feed water. This ratio of product recovery to feed may not be significant for a one gallon per hour unit, but it does become significant as the production requirements increase to the range of 100 gallons per hour. Under these conditions the operator generally uses an acid feed system or perhaps pretreatment with a softener to save on feed water although these methods require additional equipment and materials.

It is an object of the invention to provide a water distillation system that can use the membrane surface bypass method with a reduction in the amount of feed water usually associated with that method. It is another object to make efficient use of RO unit waste water in a distillation system. Another object is to provide a system for heating RO unit water input without additional equipment. It is still a further object of the invention to provide an efficient, energy saving, and inexpensive liquid distillation system.

SUMMARY OF THE INVENTION

In the system of the invention, the waste output of the RO unit is conveyed to the condenser cooling coil of the still where it is used rather than wasted. In one embodiment a portion of the coil output is recirculated to the RO unit inlet, where a temperature mixing valve with inlets fed by feed water and condenser output water mixes the two in response to a temperature control. Water from the mixing valve, at a temperature suitable for optimum use of the RO unit, is then fed to the RO unit.

BRIEF DESCRIPTION OF THE DRAWING

Other objects, features and advantages of the invention will be apparent from the following description, including the drawings, in which:

FIG. 1 is a diagrammatic representation of a distillation system embodying the invention; and FIG. 2 is a similar diagrammatic representation of an alternate embodiment of the invention.

DESCRIPTION OF THE PREFERRED EMBODIMENT

There is shown in FIG. 1 a water distillation system comprising two major treatment elements, a reverse osmosis (or RO) unit 10 and a still 12.

"Raw" water, the water immediately available from reservoirs, rivers and other normal sources, is not acceptable for many commercial or research processes that demand "pure" water. Such molecularly pure water is better known as "conductivity" water, referring to the method of determining its purity by measuring its electrical conductivity potential. The lower the conductance (or the higher the resistance) of the water, the purer it is. The impurities that exist in raw water include ions, bacteria, organics and particulates. The reverse osmosis unit 10 and the still 12 are used to remove these.

The reverse osmosis unit 10 removes dissolved solids from raw water by the principle of reverse osmosis. Normal osmosis is the process by which solvent flows through a semipermeable membrane from a dilute to a more concentrated solution. The flow creates a pressure difference across the membrane called the osmotic pressure. The process can be reversed by applying a pressure greater than osmotic to the more concentrated solution. Thus, in the reverse osmosis unit 10, raw water is brought under pressure in contact with an appropriate membrane, and purified water may be recovered from the opposite side of the membrane.

The maintenance of the reverse osmosis (or RO) unit 10, as explained in the Background, above, is however, difficult. One relatively simple procedure for maintaining the unit, by passing large quantities of water by the membrane surface, involves high ratio of discharge of waste water to purified water for the unit. The invention uses this "defect" in the procedures advantageously.

The other unit in the water purification system is the distillation unit, or still 12. Distillation is necessary as a final step in water purification to remove impurities such as bacteria, organics and dissolved substances and particulates not removed by the RO. The still 12 includes an evaporator 14 and a source of heat 15. Water to be distilled enters the evaporator through an inlet 16. Heat is applied to the evaporator by the heat source 15 to bring the water past its boiling point to become vapor. The water vapor is then passed through a condenser 18 where it is cooled by a flow of cooling water through a cooling coil 20. The cooling water enters the coil by an inlet 22 and leaves, heated by the exchange of heat with the condensing water vapor outside the coil, by an outlet 24. The condensed water vapor, or distillate, leaves the still by an outlet 26. The impurities are left behind as unevaporated residue.

The water that enters the still inlet 16 is purified water from the RO unit 10. Raw water is introduced to the RO unit through an inlet 28. The reverse osmosis process results in a certain amount of purified water leaving through an outlet 30. It also results in a large quantity of waste water leaving through a waste outlet 32, since the RO unit is maintained by the bypass procedure described above.

In the system embodying the invention the waste water leaving the RO unit 10 through outlet 32 is not discarded, but is instead conveyed by a conduit 34 to the inlet 22 of the condenser coil 20 of the still 12. There it passes through the coil that is used to cool the evaporate in the still. Another source of water for the condenser coil 20 is therefore not needed. The ratio of recovery of distillate from a still as compared to the water needed for the cooling coil of the condenser is very similar to the recovery ratio employed by a reverse osmosis system operating on the principle of high discharge to recovery ratio. Therefore with the waste from the RO unit 10 being conveyed to the condenser coil of the still 12, approximately 50% of the water normally required to operate the system is saved.

The system shown in FIG. 2 has the additional feature that the waste water from the RO unit, used to pass through the condenser coil of the still, is recirculated in its heated form, back to the input of the RO unit, because the reverse osmosis process works more efficiently at higher temperatures.

The system shown in FIG. 2 is substantially similar to that shown in FIG. 1. The RO unit 50 produces purified water at one outlet 52 that proceeds to an inlet 54 of the still 56. The water entering the still inlet 54 proceeds through the evaporator 58 and the condenser 60 and becomes distillate leaving the still at an outlet 62.

Waste water from the RO unit leaves at an outlet 64 and proceeds through a conduit 66 to the inlet 68 of the still condenser cooling coil 70. Typical rates for the flows described so far are one gallon per hour (gph) for the purified water passing from the RO unit 50 to the still evaporator 58 and 9 gph for the RO unit waste water passing from the outlet 64 through the conduit 66 to the condenser cooling coil 70. The still 56 produces about one gph of distillate under these conditions.

In the embodiment shown in FIG. 2, the heated coolant water that leaves the condenser coil 70 by way of the outlet 72 is not all discharged as in the system of FIG. 1. A portion is returned through a conduit 74 to the inlet of the RO unit 50, aided by a pump 75. Not all of the heated coolant water is needed to raise the temperature of the RO unit input. In the embodiment here described, about 8 gph of heated coolant is discharged, and about one gph is returned by conduit 74.

The heated coolant water returned by the conduit 74 is conveyed to a temperature mixing valve 76. The valve 76 has two inlets, one inlet 78 receiving the returning heated coolant water, and the other inlet 80 receiving raw water. The valve 76 has one outlet 82, which combines in output a mixture of water entering the two inlets at a ratio determined by a temperature control 84. A booster pump 86 pumps the output of the valve 76 into the RO unit inlet 88.

The system of FIG. 2 therefore utilizes the waste from the RO unit 50 to cool the still 56, and utilizes the heat transmitted to the coolant, by passing a portion of the coolant back to the RO inlet 88, to raise the temperature of water in the RO unit to an optimum temperature.

While the present invention has been described with reference to preferred embodiments, those familiar with this disclosure and skilled in the art may recognize additions, deletions, substitutions and other modifications and equivalents that would fall within the purview of the invention as set forth in the appended claims.

I claim:

1. A distillation system comprising:
    an RO unit having a feed water inlet, a treated water outlet, and a waste water outlet;
    a still having an evaporator and a condenser, said evaporator having a treated water inlet and a treated water outlet, and said condenser having a treated water inlet, a treated water outlet and a cooling coil with a feed water inlet and a heated water outlet, and
    conduit means for connecting said evaporator to said condenser, for connecting said RO unit waste water outlet to said cooling coil inlet and for connecting said RO unit treated water outlet to said evaporator inlet.

2. The system of claim 1 including means for connecting said cooling coil outlet to said RO unit feed water inlet.

3. The system of claim 2 further including a temperature controlled valve means having a first inlet for feed water, a second inlet for water from said cooling coil outlet, and an outlet for connection to said feed water inlet of said RO unit,
    said temperature controlled valve means including temperature control means and means for mixing water entering said first and second inlets, responsive to said temperature control means.

4. A distillation system comprising:
    an RO unit having a water inlet, a treated water outlet, and a waste water outlet;
    a still having an evaporator and a cooling unit, said evaporator having a treated water inlet and a treated water outlet, and said cooling unit having a treated water inlet, a treated water outlet and a cooling coil with a feed water inlet and a heated water outlet; and
    conduit means for connecting said evaporator to said cooling unit, for connecting said RO unit waste water outlet to said cooling coil inlet, for connecting said RO unit treated water outlet to said evaporator inlet, and for connecting said cooling coil heated water outlet to said RO unit water inlet.

5. The system of claim 4 further including means for supplying feed water to said RO unit water inlet, and including a temperature controlled valve means having a first inlet for feed water, a second inlet for water from said cooling coil outlet, and an outlet for connection to said RO unit water inlet,
    said temperature controlled valve means including temperature control means and means for mixing water entering said first and second inlets, responsive to said temperature control means.

6. The system of claim 4 in which said cooling units is a distillate condenser.

7. In a water distillation system comprising:

an RO unit having a feed water inlet, a treated waste outlet, and a waste water outlet;

a still having an evaporator and a condenser, said evaporator having a treated water inlet and a treated water outlet, and said condenser having a treated water inlet, a treated water outlet and a cooling coil with a water inlet and a heated water outlet; and conduit means for connecting said evaporator to said condenser, for connecting said RO unit waste water outlet to said cooling coil inlet, for connecting said RO unit treated water outlet to said evaporator inlet, and for connecting said cooling coil heated water outlet to said RO unit water inlet, a method of utilizing the waste water from the RO unit comprising the steps of:

conveying the waste water from the RO unit to the cooling coil of the still condenser, and circulating said waste water through the cooling coil.

8. The method of claim 7 further including the steps of:

collecting at least a portion of the waste water circulated through said cooling coil; and feeding said portion to the inlet of said RO unit.

9. The method of claim 8 further including mixing said portion of waste water with raw water, and feeding said mixture of said portion of waste waste and raw water to the inlet of said RO unit.

10. The method of claim 9 including mixing said portion of waste water and said raw water at a ratio determined by a temperature control to provide a mixture for said RO unit inlet that has a temperature desirable for said RO unit.

* * * * *